3,256,252
PROCESS FOR THE PRODUCTION OF ACRYLONITRILE COPOLYMERS

Winfried Kruckenberg, Leverkusen-Bayerwerk, and Karl Dinges, Cologne-Stammheim, Germany, assignors to Farbenfabriken Bayer Aktiengesellschaft, Leverkusen, Germany, a corporation of Germany
No Drawing. Filed Feb. 14, 1962, Ser. No. 173,116
Claims priority, application Germany, Mar. 2, 1961, F 33,330
20 Claims. (Cl. 260—79.3)

The invention relates to the production of acrylonitrile copolymers which have an improved affinity for basic dyestuffs.

Filaments and yarns consisting of homopolymers and also of copolymers of at least 90% of acrylonitrile with other polymerizable neutral vinyl compounds can only be dyed with difficulty in deep color tones with basic and acid dyestuffs. Many modifications of the polymer have already been proposed in order to increase the dyeing capacity.

For example, acrylonitrile polymers are known which contain 2 to 10% of vinyl pyridine units and thereby show an improved dyeing capacity for acid dyestuffs. However, by incorporation of these groups, other properties such as thermostability and the dyeing capacity with basic dyestuffs are impaired.

Furthermore, it is known to improve the dyeing capacity of acrylonitrile polymers for basic dyestuffs by monomers with carboxyl groups being copolymerized with acrylonitrile. However, such polymers show an exceptionally poor thermostability.

Furthermore, it is already known to copolymerize vinyl or alkyl sulphonic acids as well as vinyl benzene sulphonic acid or their water-soluble salts with acrylonitrile. Such polymers show an improved affinity for basic dyestuffs, but the known processes are frequently still unsatisfactory from a technical point of view. For example, the sodium methalyl sulphonates can only be copolymerized with acrylonitrile with very poor yields, whereas vinyl benzene sulphonic acids with a sufficient degree of purity are only obtainable technically with difficulty.

It is moreover known for polymerizable taurine derivatives, such as N-acryloyl-taurine to be polymerized by itself or with other monomers and for the polymers obtained to be used for the production of graft polymers with a relatively high content of combined acrylonitrile (see U.S. Patent 2,949,435). With these taurine derivatives, the nitrogen atom of the taurine always carries a hydrogen atom. These polymerizable N-monosubstituted taurine derivatives cannot be satisfactorily copolymerized with acrylonitrile.

If a monomer mixture of 95% acrylonitrile, 4% of methyl acrylate and 1% of N-acryloyl-taurine is subjected to polymerization, the polymer contains less than 0.045% of taurine derivative. Thus, of the quantity of the N-acrylol-taurine which is offered, only 4.5% have become copolymerized. If N-acryloyl taurine is replaced by N-acryloyl-p-aminophenyl-methane sulphonic acid, similar results are obtained. In the copolymerization with acrylonitrile, only 5.6% of the quantity introduced are copolymerized. With this sulphonic acid, the nitrogen atom likewise carries a hydrogen atom.

Since the polymers prepared in this manner always only contain a very small quantity of sulphonic acid groups, on account of the poor copolymerization capacity of the sulphonic acid, they can only be dyed slightly better than the comparable acrylonitrile polymers without sulphonic acid groups.

An additional disadvantage of these copolymers lies in the fact that they form gel particles on being dissolved in dimethyl formamide. Due to this lack of homogeneity of the dimethyl formamide solution, the spinning process is detrimentally affected. Acrylonitrile polymers which contain combined polymerizable N-monosubstituted taurine derivatives are for these reasons of no interest for technical application.

It has now been found that acrylonitrile coopolymers with at least 70% of combined acrylonitrile are obtained with a good yield and with considerably improved affinity for basic dyestuffs, good thermostability and with a low tendency to gel formation, if acrylonitrile, if desired in the presence of other copolymerizable monomers, is polymerized with 0.1 to 10% based on the monomers to be polymerized, of a compound of the following general formula:

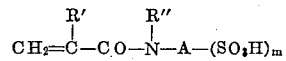

in which R' stands for a hydrogen atom, a methyl group or a chlorine atom, R" for an alkyl group with 1 to 8 carbon atoms, an aryl radical or aralkyl radical, A for $(CH_2)_n$, a phenylene radical or for

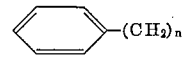

$n$ representing an integer between 1 and 4 and finally $m$ standing for an integer between 1 and 3.

With the compounds used according to the invention, the nitrogen atom no longer carries any hydrogen atoms. It is saturated by three other radicals.

It must be considered to be extremely surprising that only then copolymers with a considerably improved affinity for basic dyestuffs and with a low tendency to gelling are obtained by using, for the copolymerization with acrylonitrile, those aminosulphonic acids of which the nitrogen no longer carries any hydrogen atoms. It is possible to obtain high dyestuff affinity since the sulphonic acids according to the invention copolymerize to a high degree during the copolymerization. For example, if a monomer mixture of 95% acrylonitrile, 4% methyl acrylate and 1% n-acryloyl-N-butyltaurine is subjected to the polymerization, the copolymer which is obtained contains 0.87% of taurine derivative. Thus, 87% of the quantity presented are copolymerized. If the N-acryloyl-N-butyltaurine is replaced by N-acryloyl-N-phenylmethane sulphonic acid, 92% of this sulphonic acid are copolymerized.

If the copolymers obtainable according to the invention are dissolved in dimethyl formamide, no gel particles are formed. The solutions can easily be spun in the conventional manner.

The comonomers according to the invention are based on the general formula and the following are to be mentioned as examples:

N-butyl-N-β-ethylsulphonic acid methacrylamide,
N-butyl-N-β-ethylsulphonic acid acrylamide,
N-phenyl-N-methylsulphonic acid-acrylamide,
N-phenyl-N-methylsulphonic acid-α-chloracrylamide,
N-phenyl-N-ethylsulphonic acid methacrylamide,
N-methyl-N-P-ethylsulphonic acid-acrylamide,
N-methyl-N-β-ethylsulphonic acid-methacrylamide,
N-ethyl-acrylamido-benzene-disulpho acid,
N-butyl-methacrylamido-benzene-disulpho acid,

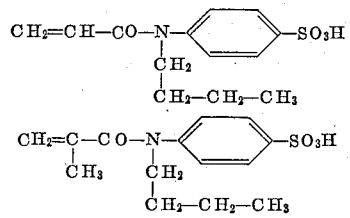

N-butyl-acrylamido-p-toluodisulpho acid,
N-phenyl acrylamido-p-toluodisulpho acid,
N-propyl-methylacrylamido-p-toluodisulpho acid, The sulphonic acids according to the invention can also be used in the form of their water-soluble salts, more especially as alkali and alkaline earth metal salts.

The copolymerization according to the invention of acrylonitrile and sulphonic acid can also be carried out in the presence of other ethylenically unsaturated compounds which can be polymerized with acrylonitrile. As such comonomers, there are to be considered all ethylenically unsaturated compounds which are usually copolymerized with acrylonitrile. Included herein are inter alia, acrylic and methacrylic acid esters, styrene, vinyl chloride, vinylidene chloride and vinyl acetate. These comonomers can be used in quantities from 1 to 20%, calculated on the acrylonitrile.

The polymerization of acrylonitrlie with the compounds according to the invention and possibly with other monomers can be effected by processes known per se in block, dispersion, emulsion or solution. For the emulsion polymerization, it is possible to introduce the known emulsifiers, such as salts of fatty acids, and alkyl or aryl sulphonates, and also non-ionic emulsifiers.

However, it is preferred to carry out polymerization without adding emulsifiers in aqueous solution and with radical formers.

By radical formers, there are understood all compounds which are able in known manner to initiate the polymerization, such as diacyl peroxides, dialkyl peroxides, hydrogen peroxide, alkyl hydroperoxide, aryl hydroperoxide and azo-compounds, such as azo-diisobutyric acid nitrile. Particularly suitable for the polymerization are Redox Systems, such as the system based on persulphate and sulphur compounds of low oxidation stages.

Suitable as per-compounds are the alkali salts, particularly the sodium or potassium salt of persulphuric acid. However, the salts of perphosphoric acid can also be employed. The most important sulphur compounds of low oxidation stage are: sulphur dioxide alkali pyrosulphites, alkali hydrogen sulphites, alkali thiosulphates and the corresponding ammonium salts. Among the alkali salts, the sodium and potassium salts are especially suitable. The per-compounds are used in quantities from 0.5 to 5%, calculated on the monomers to be polymerized, and advantageously 1 to 2%. The sulphur compounds of low oxidation stage are used in quantities from 0.5 to 10%, calculated on the monomers to be polymerized, and advantageously 1 to 4%. For further activation, relatively small quantities of heavy metal ions can be added to the system.

These heavy metal ions, which are preferably added in the form of their salts, such as sulphates or chlorides or nitrates, comprise mainly the salts of divalent iron and copper. Generally, quantities of 0.00001 to 0.1%, calculated on the monomers being used, are sufficient.

The polymerization according to the invention can for example be carried out as follows in aqueous medium. Advantageously, 500 to 1000 parts by weight of water are used to 100 parts by weight of monomer. The reaction temperatures are between 30 and 70° C., but advantageously between 40 and 50° C. It has been found to be especially advantageous to start the polymerization with some of the reactants and auxiliary substances and then constantly to add all components of the mixture.

The pH-value which is below 7 and is advantageously between 1 and 3, is generally adjusted with dilute sulphuric acid, but other mineral acids such as phosphoric acid can also be used.

One special form of the polymerization according to the invention is carried out in the presence of phosphoric acid and small quantities of copper ions.

*Example 1*

24,000 g. of salt-free water are placed in a stainless steel 40-litre stirrer-type vessel comprising a stirrer mechanism, thermometer and a supply union. Thereafter, 27 g. of sodium acetate are dissolved in water and then a pH-value of 2.6 is adjusted with approximately 400 cc. of normal sulphuric acid. After the solution has been heated to 45° and the air has been displaced by nitrogen, 15.4 g. of potassium persulphate and 30.8 g. of sodium pyrosulphite, each dissolved in 150 g. of salt-free water, are added. At the same time, there is initiated the introduction of a mixture of 4465 g. of acrylonitrile and 190 g. of methyl acrylate and also of 360 g. of a 26.5% aqueous solution of N-butyl-N-β-ethylsulphonic acid-acrylamide. The running-in speeds are so regulated that the total quantity has been introduced in 330 minutes. After 120 and 240 minutes, 6.1 g. of potassium persulphate and 12.2 g. of sodium pyrosulphite (each dissolved in 2000 cc. of salt-free water) are added.

After filtration, washing and drying at 50°, a total quantity of 4650 g. of a pure white polymer (1A) with the K-value 102. 5 (according to Fikentscher, Cellulosechemie 13, page 58, 1932). Serving for comparison purposes is another polymer (1B) which was polymerized in a manner analagous to polymer 1A. Its K-value is 101 and its composition is: 94% of acrylonitrile (as polymer 1A) and 6% of methyl acrylate.

Using the polymers A and B and dimethyl formamide as solvent, 23% solutions are prepared and these are spun by a dry spinning process to form filaments. These are stretched by 320% in boiling water, dried under tension and shrunk in a steam atmosphere at 105°. Thereafter, they have the same single count of 2.9 den. and also identical mechanical textile values, namely a breaking strength of about 2.85 g./den. and a breaking elongation of about 36.5%.

In order to test their affinity for cationic dyestuffs, the filaments are dyed in a single bath with 5% of the pure dyestuff, the production of which is described in Example 3 of French Patent 1,158,839, a liquor ratio of 1:50 being chosen and the dye liquor being kept for 2 hours at 98 to 100° C., with addition of acetic acid and sodium acetate. The filaments of polymer 1A are thereafter dyed a deep dark blue colour, whereas the filaments of polymer 1B only show a medium blue tone.

The quantities of dyestuff absorbed by the filaments are measured colorimetrically, using dilute solutions of the filaments in dimethyl formamide. For filaments of polymer 1A, there is found a 67% higher dyestuff absorption by comparison with the filaments of polymer 1B.

*Example 2*

1 g. of sodium sulphate and 16 cc. of normal sulphuric acid are dissolved in 900 g. of salt-free water. After displacing the air by nitrogen, 176.2 g. of acrylonitrile, 7.5 g. of butyl acrylate and 2 g. of the compound

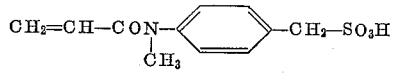

are added. Activation is thereafter effected with a solution of 0.5 g. of potassium persulphate in 200 g. of water and also another solution of 1.0 g. of sodium pyrosulphite in 100 g. of water. During the polymerization, the temperature is kept at 50°. After 4 to 5 hours, a pure white polymer having the K-value 80 is obtained with a yield of 94%, this polymer having an improved affinity with respect to basic dyestuffs.

*Example 3*

200 litres of salt-free water are placed in an enamel vessel, acidified with 380 cc. of concentrated phosphoric acid and then 40 mg. of copper sulphate are added. After adding 180 g. of potassium persulphate and 360 g. of sodium pyrosulphite, 35.5 kg. of acrylonitrile, 1.5 kg. of methyl acrylate and 0.5 kg. of N-butyl-N-β-ethylsulphoacid-methacrylamide are run-in within a period of 6 hours at 40° C. After a polymerization period of 2 hours and 4 hours, the batch is reactivated each time with 54 g. of potassium persulphate and 108 g. of sodium pyrosulphite (dissolved in 20 litres of water).

In this way, there is obtained a yield of 95% of a pure white polymer with the K-value 90.8, the polymer having excellent thermostability and an improved affinity for basic dyestuffs.

Example 4

In accordance with the process according to Example 1, a copolymer is prepared from 4700 g. of acrylonitrile, 200 g. of methyl acrylate and 690 g. of a 14.5% aqueous solution of N-phenyl-N-methyl sulphonic acid acrylamide.

There is obtained a yield of 92% of a pure white polymer (4A) with the K-value 94.7, the polymer containing 1.4% of the sulpho-acid which is supplied.

Without using N-phenyl-N-methylsulphonic acid acrylamide, but instead with an additional supply of 210 g. of methyl acrylate, a comparison polymer is prepared with the K-value 95.6 (polymer 4B), which polymer, like polymer 4A, consists of about 92% of combined acrylonitrile and about 8% of mixed component. The two polymers are dissolved in dimethyl acetamide to form 17.5% solutions and wet-spun. After stretching the congulated filaments to 6.5 times their initial length, drying and relaxation in completely identical manner, filaments with the single count of 2.15 den. are obtained, these filaments showing a breaking strength of about 3.1 g./den. and breaking elongations of about 27.5%.

Using identical conditions and separate dyeing baths, the filaments are dyed at boiling temperature to the point of saturation, with addition of acetic acid and sodium acetate, and using a red dyestuff, the production of which is described in Example 4 of French Patent 1,158,839.

The exhaustion of the dye baths as a function of time is measured colorimetrically. The measured values show on average an absorption rate for the filaments consisting of polymer 4A which is higher by 32.5% than that for the filaments consisting of polymer 4B. The dye absorption value measured according to the data given in Example 1, with complete dyeing until the filaments are saturated with dyestuff, provides the comparison No. 147 for filaments consisting of polymer 4A, by comparison with 100 for filaments consisting of polymer 4B.

Example 5

1800 g. of salt-free water are brought with about 38 cc. of a normal sulphuric acid to a pH-value of 2.5. After the air in the reaction vessel has been replaced by nitrogen, the temperature is raised to 40° C. After adding 1.0 g. of potassium persulphate and 2.0 g. of sodium pyrosulphite, 6.2 g. of the sodium salt of N-phenyl-N-methyl sulphonic acid methacrylamide are added and the introduction of a mixture of 113.4 g. of acrylonitrile and 6.4 g. of vinyl acetate is started. The speed of introduction is so regulated that the total quantity has run-in after 240 minutes. After 60 minutes and 150 minutes, respectively, reactivation is carried out on each occasion with 0.5 g. of potassium persulphate (dissolved in 200 g. of water) and 1.0 g. of sodium pyrosulphite (dissolved in 100 g. of water).

A yield of 92% of a pure white polymer with the K-value 90.0 is obtained, and the content of incorporated sulphur is 0.38%.

We claim:

1. In the process of producing acrylonitrile copolymers containing at least 70% acrylonitrile by polymerizing acrylonitrile and at least one other monomer copolymerizable therewith, the step for obtaining copolymers of improved dyeing capacity of polymerizing a member selected from the group consisting of acrylonitrile and mixtures of acrylonitrile with another monoethylenically unsaturated co-monomer, wherein said acrylonitrile is present in an amount of at least 70% and 0.1 to 10% based on the monomeric group member of a polymerizable sulphonic acid group-containing compound having the formula

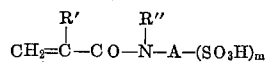

wherein R' is selected from the group consisting of hydrogen, methyl and chlorine, R'' is selected from the group consisting of lower alkyl containing up to eight carbon atoms, aryl and aralkyl, A is selected from the group consisting of $-(CH_2)_n-$, phenylene and phenyl $-(CH_2)_n-$, n is an integer of 1 to 4 and m is an integer of 1 to 3.

2. In the process of producing acrylonitrile copolymers containing a major amount of acrylonitrile by polymerizing acrylonitrile and at least one other monomer copolymerizable therewith, the step for obtaining copolymers of improved dyeing capacity of polymerizing a member selected from the group consisting of acrylonitrile and mixtures of acrylonitrile with another monoethylenically unsaturated co-monomer, wherein said acrylonitrile is present in a major amount and a polymerizable sulphonic acid group-containing compound having the formula

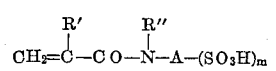

wherein R' is selected from the group consisting of hydrogen, methyl and chlorine, R'' is selected from the group consisting of lower alkyl containing up to eight carbon atoms, aryl and aralkyl, A is selected from the group consisting of $-(CH_2)_n-$, phenylene and phenyl $-(CH_2)_n-$, n is an integer of 1 to 4 and m is an integer of 1 to 3, and utilizing said polymerizable sulfonic acid group containing compound in an amount of 0.1 to 10% based on said first-mentioned group member.

3. Process according to claim 2 wherein said polymerizable sulphonic acid group-containing compound is N-butyl-N-β-ethyl-sulphonic acid methacrylamide.

4. Process according to claim 2 wherein said polymerizable sulphonic acid group-containing compound is N-butyl-N-β-ethyl-sulphonic acid acrylamide.

5. Process according to claim 2 wherein said polymerizable sulphonic acid group-containing compound is N-pheny-N-methyl-sulphonic acid acrylamide.

6. Process according to claim 2 wherein said polymerizable sulphonic acid group-containing compound is N-phenyl-N-methyl-sulphonic acid-α-chloracrylamide.

7. Process according to claim 2 wherein said polymerizable sulphonic acid group-containing compound is N-phenyl-N-ethyl-sulphonic acid methacrylamide.

8. Process according to claim 2 wherein said polymerizable sulphonic acid group-containing compound is N-methyl-N-P-ethyl-sulphonic acid-acrylamide.

9. Process according to claim 2 wherein said polymerizable sulphonic acid group-containing compound is N-methyl-N-β-ethyl-sulphonic acid-methacrylamide.

10. Process according to claim 2 wherein said polymerizable sulphonic acid group-containing compound is N-ethyl-acrylamido-benzene-disulpho acid.

11. Process according to claim 2 wherein said polymerizable sulphonic acid group-containing compound is N-butyl-methacrylamido-benzene-disulpho acid.

12. Process according to claim 2 wherein said polymerizable sulphonic acid group-containing compound is

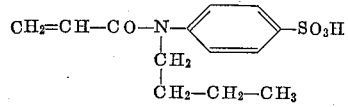

13. Process according to claim 2 wherein said polymerizable sulphonic acid group-containing compound is

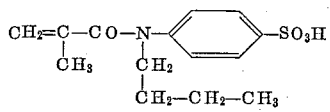

14. Process according to claim 2 wherein said polymerizable sulphonic acid group-containing compound is N-butyl-acrylamido-p-toluodisulpho acid.

15. Process according to claim 2 wherein said polymerizable sulphonic acid group-containing compound is N-phenyl-acrylamido-p-toluodisulpho acid.

16. Process according to claim 2 wherein said polymerizable sulphonic acid group-containing compound is N-propyl-methacrylamido-p-tuluodisulpho acid.

17. A copolymer of
   (1) a member selected from the group consisting of acrylonitrile and mixtures of acrylonitrile with another monoethylenically unsaturated co-monomer, wherein said acryonitrile is present in a major amount and
   (2) a polymerizable sulphonic acid group-containing compound having the formula

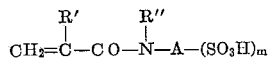

wherein R′ is selected from the group consisting of hydrogen, methyl and chlorine, R″ is selected from the group consisting of lower alkyl containing up to eight carbon atoms, aryl and aralkyl, A is selected from the group consisting of —(CH$_2$)$_n$—, phenylene and phenyl —(CH$_2$)$_n$—, $n$ is an integer of 1 to 4 and $m$ is an integer of 1 to 3, said polymerizable sulphonic acid group-containing compound being present in said copolymer composition in an amount of 0.1 to 10% of said copolymer.

18. A copolymer according to claim 17 wherein said group member designated (1) is a mixture of acrylonitrile and a mono-ethylenically unsaturated co-monomer, said monoethylenically unsaturated co-monomer being present in an amount of from 1 to 20% referred to the acrylonitrile.

19. A copolymer according to claim 17 wherein said polymerizable sulphonic acid group-containing compound is N-butyl-N-β-ethyl-sulphonic acid methacrylamide.

20. A copolymer according to claim 17 wherein said polymerizable sulphonic acid group-containing compound is N-phenyl-N-methyl-sulphonic acid acrylamide.

References Cited by the Examiner

UNITED STATES PATENTS 2,983,712   5/1961   Wilkinson _____ 260—79.3

JOSEPH L. SCHOFER, *Primary Examiner.*

LEON J. BERCOVITZ, *Examiner.*

P. HENDRICKSON, F. L. DENSON,
         *Assistant Examiners.*